(12) United States Patent
Yasui et al.

(10) Patent No.: US 8,892,329 B2
(45) Date of Patent: Nov. 18, 2014

(54) SPEED CONTROL APPARATUS FOR VEHICLE

(75) Inventors: Yoshiyuki Yasui, Nagoya (JP); Hideaki Koto, Anjyo (JP); Manabu Tanaka, Utsunomiya (JP); Takayuki Miyajima, Anjyo (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 801 days.

(21) Appl. No.: 12/849,494

(22) Filed: Aug. 3, 2010

(65) Prior Publication Data
US 2011/0035131 A1 Feb. 10, 2011

(30) Foreign Application Priority Data
Aug. 5, 2009 (JP) ................................. 2009-182660

(51) Int. Cl.
*B60T 8/24* (2006.01)
*B60T 8/32* (2006.01)
*B60W 30/14* (2006.01)

(52) U.S. Cl.
CPC ....... *B60W 30/146* (2013.01); *B60W 2550/143* (2013.01)
USPC .............................................. 701/72; 701/93

(58) Field of Classification Search
None
See application file for complete search history.

(56) References Cited

U.S. PATENT DOCUMENTS

| 5,978,731 | A | * | 11/1999 | Matsuda | 701/93 |
| 6,141,619 | A | * | 10/2000 | Sekine | 701/93 |
| 6,175,799 | B1 | * | 1/2001 | Tsutsumi et al. | 701/96 |
| 6,208,927 | B1 | * | 3/2001 | Mine et al. | 701/70 |
| 6,212,465 | B1 | * | 4/2001 | Sielagoski et al. | 701/96 |
| 6,317,679 | B2 | * | 11/2001 | Sielagoski et al. | 701/96 |
| 6,363,311 | B1 | * | 3/2002 | Kuroda et al. | 701/96 |
| 6,385,528 | B1 | * | 5/2002 | Takahashi | 701/93 |
| 6,392,535 | B1 | * | 5/2002 | Matsuno et al. | 340/441 |
| 6,408,241 | B1 | * | 6/2002 | Sielagoski et al. | 701/96 |

(Continued)

FOREIGN PATENT DOCUMENTS

| DE | 197 49 916 A1 | 5/1998 |
| EP | 2 082 936 A2 | 7/2009 |

(Continued)

OTHER PUBLICATIONS

Official Action issued by German Patent Office on Nov. 5, 2013 in German Application No. 10 2010 038 848.3, and English language translation of Official Action (13 pgs).

*Primary Examiner* — Khoi Tran
*Assistant Examiner* — Robert Nguyen
(74) *Attorney, Agent, or Firm* — Buchanan Ingersoll & Rooney P.C.

(57) ABSTRACT

A plurality of position data sets representing a plurality of points on a road ahead of a vehicle are acquired, and the degree of curvature of the road at each point is computed. On the basis of the degree of curvature, a constant curvature degree section of a curve is identified, and the degree of curvature and the end position of the constant curvature degree section are determined. In order to cause the vehicle to properly pass through the curve, curve deceleration control is executed on the basis of the actual vehicle speed, a proper vehicle speed determined from the degree of curvature, and the end position of the constant curvature degree section. That is, the curve deceleration control is performed on the basis of the start point of a section of a curve having the maximum degree of curvature and the constant degree of curvature of that section.

7 Claims, 9 Drawing Sheets

(56) References Cited

U.S. PATENT DOCUMENTS

| | | | |
|---|---|---|---|
| 6,424,904 B1 * | 7/2002 | Takahashi et al. | 701/70 |
| 6,526,345 B2 * | 2/2003 | Ryoo | 701/93 |
| 6,778,896 B1 * | 8/2004 | Matsuura et al. | 701/70 |
| 6,862,523 B2 * | 3/2005 | Joshi | 701/93 |
| 6,970,779 B2 * | 11/2005 | Kagawa et al. | 701/93 |
| 7,266,438 B2 * | 9/2007 | Kellum et al. | 701/93 |
| 7,337,055 B2 * | 2/2008 | Matsumoto et al. | 701/93 |
| 7,400,963 B2 * | 7/2008 | Lee et al. | 701/93 |
| 7,433,772 B2 * | 10/2008 | Isaji et al. | 701/71 |
| 7,634,346 B2 * | 12/2009 | Abe | 701/96 |
| 7,751,962 B2 * | 7/2010 | Yamamura et al. | 701/93 |
| 7,751,973 B2 * | 7/2010 | Ibrahim | 701/412 |
| 7,774,121 B2 * | 8/2010 | Lee et al. | 701/70 |
| 7,778,758 B2 * | 8/2010 | Tsuchiya et al. | 701/93 |
| 7,792,624 B2 * | 9/2010 | Nakamura et al. | 701/72 |
| 7,925,416 B2 * | 4/2011 | Perisho et al. | 701/96 |
| 8,005,602 B2 * | 8/2011 | Bando et al. | 701/93 |
| 8,024,099 B2 * | 9/2011 | Suzuki et al. | 701/70 |
| 8,078,381 B2 * | 12/2011 | Yamakado et al. | 701/93 |
| 8,150,591 B2 * | 4/2012 | Isaji et al. | 701/70 |
| 8,165,775 B2 * | 4/2012 | Nakamura | 701/96 |
| 8,170,769 B2 * | 5/2012 | Tsuchiya et al. | 701/93 |
| 8,195,371 B2 | 6/2012 | Yasui et al. | |
| 8,214,126 B2 * | 7/2012 | Miyajima et al. | 701/93 |
| 8,265,847 B2 * | 9/2012 | Miyajima et al. | 701/72 |
| 2001/0041959 A1 * | 11/2001 | Satou et al. | 701/70 |
| 2002/0138193 A1 * | 9/2002 | Miyahara | 701/96 |
| 2002/0177936 A1 * | 11/2002 | Matsui | 701/96 |
| 2003/0109980 A1 * | 6/2003 | Kojima et al. | 701/96 |
| 2004/0068359 A1 * | 4/2004 | Neiss et al. | 701/96 |
| 2005/0004743 A1 * | 1/2005 | Kojima et al. | 701/96 |
| 2005/0240334 A1 * | 10/2005 | Matsumoto et al. | 701/93 |
| 2007/0208485 A1 * | 9/2007 | Yamamura et al. | 701/93 |
| 2008/0059036 A1 * | 3/2008 | Imai et al. | 701/93 |
| 2010/0082216 A1 * | 4/2010 | Yasui et al. | 701/93 |
| 2013/0006473 A1 * | 1/2013 | Buerkle et al. | 701/41 |
| 2013/0080019 A1 * | 3/2013 | Isaji et al. | 701/96 |

FOREIGN PATENT DOCUMENTS

| | | | |
|---|---|---|---|
| JP | 3385812 B | * | 2/1997 |
| JP | 3385812 B2 | | 1/2003 |
| JP | 2003-312309 A | | 11/2003 |
| JP | 2006-331000 A | | 12/2006 |
| JP | 2006331000 A | * | 12/2006 |
| JP | 2007-22431 A | | 2/2007 |
| JP | 2009-032031 A | | 2/2009 |
| JP | 2009032031 A | * | 2/2009 |
| JP | 2009-126255 A | | 6/2009 |

* cited by examiner

SPEED CONTROL APPARATUS FOR VEHICLE

BACKGROUND OF THE INVENTION

1. Field of the Invention

The present invention relates to a speed control apparatus for a vehicle, and particularly to such a speed control apparatus which automatically decelerates the vehicle (performs deceleration control) when the vehicle passes through a curve of a road present ahead of the vehicle.

2. Description of the Related Art

As shown in FIG. 9, in an ordinary road, each single curve is composed of an approaching transition curve section, a constant curvature degree section, and a departing transition curve section, in this sequence, from a curve start point (curve entrance) toward a curve end point (curve exit). Each of the transition curves is composed of, for example, a clothoid curve. The transition curve sections are provided in order to enable the vehicle to smoothly pass through the curve through a driver's operation of gradually rotating a steering wheel and then gradually returning the steering wheel to its neutral position, without requiring the driver to rapidly rotate the steering wheel.

Japanese Patent No. 3385812 discloses a speed control apparatus for a vehicle. In the apparatus disclosed in this patent, in order to cause a vehicle to enter a curve at a proper vehicle speed, there are obtained a deceleration distance required for decelerating the vehicle before entering the curve, and a remaining distance, which is the distance between the present position of the vehicle and the curve start point. When the decreasing remaining distance becomes equal to the deceleration distance, deceleration control is started. When the remaining distance becomes zero and the vehicle passes through the curve start point, the deceleration control is ended. That is, the deceleration control is executed so that a vehicle speed appropriate for traveling along the curve is attained at the curve start point.

In an apparatus disclosed in Japanese Patent Application Laid-Open (kokai) No. 2006-331000, a vehicle speed proper for traveling along a curve is determined on the basis of the radius of the curve. The determined proper vehicle speed is then adjusted on the basis of the road length of a constant curvature degree section, or the lengths of transition curve sections (sections each composed of a clothoid curve).

In an apparatus disclosed in Japanese Patent Application Laid-Open (kokai) No. 2009-32031, the following processing is performed in order to obtain a point at which the curvature starts to change (i.e., a curve start point). First, from a curve of a road on which a vehicle travels, a constant curvature degree section is extracted or identified, and the start point and curvature of the constant curvature degree section of the curve are acquired. Identification of this constant curvature degree section is performed on the basis of information regarding actual operation of the vehicle (e.g., a state in which a constant steering angle is maintained continues over a predetermined period of time or more). Subsequently, on the basis of the curvature of the constant curvature degree section, information regarding a transition curve section (a section composed of a clothoid curve), which is connected to the constant curvature degree section, is acquired. The curve start point is acquired on the basis of the information indicating the transition curve section and the start point of the constant curvature degree section. Subsequently, on the basis of the acquired curve start point, suspension control is performed for adjusting the characteristics of the suspensions such that they become suitable for the curve.

That is, in the apparatus disclosed in Japanese Patent Application Laid-Open No. 2009-32031, the curve start point is acquired on the basis of the information regarding the actual operation of the vehicle. Therefore, in a curve along which the vehicle travels for the first time, only the processing of acquiring the curve start point is performed, and suspension control cannot be executed. When the vehicle travels along the curve for a second or subsequent time, the suspension control is executed, while the acquired curve start point is used as a reference.

Here, a case where a curve has a long approaching transition curve section is assumed. In this case, if, as in the apparatus disclosed in Japanese Patent No. 3385812, deceleration control is performed, with the curve start point used as a reference, such that deceleration ends at the curve start point, the deceleration control starts and ends earlier than a driver expects. Therefore, in some cases, the driver feels an unnatural sensation.

SUMMARY OF THE INVENTION

The present invention has been accomplished in order to solve the above-described problem, and its object is to provide a speed control apparatus for a vehicle which can realize deceleration control which mitigates unnatural sensation that a driver feels when the vehicle passes through a curve located ahead of the vehicle.

A speed control apparatus for a vehicle according to the present invention comprises vehicle speed acquisition means (B1), vehicle position acquisition means (B2), position data acquisition means (B3), curvature degree acquisition means (B4), constant curvature degree section identification means (B5), constant curvature degree acquisition means (B6), end position determination means (B7), and control means (B8). In the following, these means will be described on a means-by-means basis.

The vehicle speed acquisition means (B1) acquires an actual speed (Vxa) of the vehicle. The actual vehicle speed (Vxa) can be acquired by use of one of known methods, such as a method which utilizes outputs of wheel speed sensors.

The vehicle position acquisition means (B2) acquires a position (Pvh) of the vehicle. The vehicle position (Pvh) can be acquired by use of, for example, a global positioning system which is contained in a navigation apparatus mounted on the vehicle.

The position data acquisition means (B3) acquires position data sets (Nd[n]) representing the positions of a plurality of points on a road located ahead of the vehicle traveling on the road. The plurality of position data sets (Nd[n]) can be acquired by use of, for example, road information stored in the navigation apparatus.

The curvature degree acquisition means (B4) acquires a degree of curvature (Rc[n]) of the road at each of points (node points) corresponding to the position data sets (Nd[n]). That is, the degree of curvature (Rc[n]) at each node point is acquired. The degree of curvature (Rc[n]) can be acquired by use of, for example, road information stored in the navigation apparatus (each node point and the corresponding degree of curvature are stored such that they are related to each other).

Each degree of curvature (Rc[n]) can be acquired on the basis of the plurality of position data sets (Nd[n]). Specifically, in the case where, on the basis of the plurality of position data sets (Nd[n]), a first point (Nd[1]), a second point (Nd[2]), and a third point (Nd[3]) on the road are selected (from the plurality of node points), a first perpendicular bisector (Ls[1]) of a line whose opposite ends are located at the first point (Nd[1]) and the second point (Nd[2]), and a second perpendicular bisector (Ls[2]) of a line whose opposite ends are located at the second point (Nd[2]) and the third point (Nd[3]) can be computed, and the degree of curvature (Rc[2]) at the second point (Nd[2]) can be computed on the basis of an intersection (Ins) between the first perpendicular bisector (Ls[1]) and the second perpendicular bisector (Ls[2]).

The processing of acquiring the degree of curvature at the second point by this method is repeatedly executed, while a different one of the plurality of node points is selected as the second point. Thus, the degree of curvature (Rc[n]) at each node point is acquired. Employment of this method eliminates the necessity of storing data representing the degree of curvature at each node point. Accordingly, the above-mentioned road information can be simplified.

The constant curvature degree section identification means (B5) identifies a constant curvature degree section (Cr#) whose degree of curvature (Rc[n]) is constant on the basis of the plurality of position data sets (Nd[n]) and the degree of curvature (Rc[n]) at each node point. For example, the constant curvature degree section (Cr#) can be defined as a section on the road whose distance is equal to or greater than a predetermined distance and in which the difference between the maximum and minimum values of the degrees of curvatures at a plurality of successive node points contained in the section is equal to or less than a predetermined value. Since the constant curvature degree section (Cr#) can be identified and acquired on the basis of the plurality of position data sets (Nd[n]) and the degree of curvature (Rc[n]) at each node point, a constant curvature degree section can be identified and acquired even in a curve along which the vehicle travels for the first time.

The constant curvature degree section contains not only a constant curvature degree section (a section of a curve in which the degree of curvature is constant) corresponding to a curve section, but also a constant curvature degree section corresponding to a straight section. In the following description, the constant curvature degree section corresponding to a curve section may be referred to as an "in-curve constant curvature degree section," and the constant curvature degree section corresponding to a straight section may be simply referred to as a "straight section.

The constant curvature degree acquisition means (B6) acquires a constant degree of curvature (Rm#) of the constant curvature degree section (Cr#). The constant degree of curvature (Rm#) can be set to, for example, the average of the degrees of curvatures at the plurality of node points contained in the constant curvature degree section (Cr#). There can be provided determination means for identifying the in-curve constant curvature degree section and the straight section on the basis of the constant degree of curvature (Rm#). Specifically, when the constant radius of curvature (Rm#), which serves as the constant degree of curvature, is greater than a predetermined value (or when a constant curvature (1/Rm#), which serves as the constant degree of curvature, is smaller than a predetermined value), the constant curvature degree section is identified as a straight section; and when the constant radius of curvature (Rm#) is not greater than the predetermined value (or when the constant curvature (1/Rm#) is not smaller than the predetermined value), the constant curvature degree section is identified as an in-curve constant curvature degree section. In the following description, the constant degree of curvature (Rm#) of the in-curve constant curvature degree section may be referred to as the "in-curve constant curvature degree."

The end position determination means (B7) determines positions (Px#, Py#) of end points of the constant curvature degree section (Cr#). The end positions (Px#, Py#) may be node points themselves which correspond to the opposite ends of the plurality of node points contained in the constant curvature degree section (Cr#), or points near the node points corresponding to the opposite ends (e.g., points determined through interpolation between the node points corresponding to the opposite ends and node points adjacent thereto). In the following description, the end positions (Px#) of the in-curve constant curvature degree section may be referred to as "curve end positions," and the end positions (Py#) of the straight section may be referred to as "straight-line end positions."

The control means (B8) executes vehicle speed control (deceleration control) for controlling the speed of the vehicle (even when a driver does not perform accelerating or decelerating operation) on the basis of the actual speed (Vxa) of the vehicle, the position (Pvh) of the vehicle, the in-curve constant curvature degree (Rm#), and the curve end position (Px#). In general, in the vehicle speed control, the start point of the in-curve constant curvature degree section (Cr#) (that is, the end point of the approaching transition curve section (see the point Cs in FIG. 9 and the point Pxc in FIG. 4)) is used as the curve end position (Px#).

This control means (B8) can also be described to execute the vehicle speed control on the basis of the "end position (Pxc) of the in-curve constant curvature degree section (Crc) closer to the straight section (Cra)" and the "constant degree of curvature (Rmc) of the in-curve constant curvature degree section (Crc)" in the case where the identified straight section (Cra) and in-curve constant curvature degree section (Crc) are located adjacent to each other, and the end position (Pyb) of the straight section (Cra) closer to the in-curve constant curvature degree section (Crc) differs from the end position (Pxc) of the in-curve constant curvature degree section (Crc) closer to the straight section (Cra).

As described above, in general, a single curve is composed of an approaching transition curve section, a (in-curve) constant curvature degree section, and a departing transition curve section, in this sequence, from a curve entrance toward a curve exit. In this case, within the curve, the constant curvature degree section has the largest degree of curvature (the largest curvature, the smallest radius of curvature). That is, the start point of the in-curve constant curvature degree section (see the point Cs in FIG. 9 and the point Pxc in FIG. 4) is the first point at which the lateral acceleration acting on the vehicle becomes the maximum when the vehicle passes through the curve at a constant vehicle speed. Accordingly, conceivably, in the case where the vehicle speed control is executed to as to cause the vehicle to smoothly pass through the curve, it is preferred to adjust the vehicle speed on the basis of the start point of the in-curve constant curvature degree section (see the point Cs in FIG. 9 and the point Pxc in FIG. 4) and the in-curve constant curvature degree.

The above-described configuration is based on this finding. By virtue of the above-described configuration, the vehicle speed can be adjusted such that, near the start point of the in-curve constant curvature degree section, the vehicle speed decreases to a proper value determined in consideration of the in-curve constant curvature degree. Accordingly, the vehicle speed control readily becomes one in which the shape of the constant curvature degree section having the largest degree of curvature is taken into consideration and which matches a driver's intention. As a result, the unnatural sensation which the vehicle speed control imparts to the driver can be mitigated. In addition, since the start point of the in-curve constant curvature degree section, which is required for the vehicle speed control, is acquired from the position data and the degree of curvature at each node point rather than information regarding the actual operation of the vehicle, the vehicle speed control can be executed properly even for a curve along which the vehicle travels for the first time.

Specifically, during the vehicle speed control, a first target vehicle speed (Vt1) of the vehicle is computed on the basis of the in-curve constant curvature degree (Rm#) and the curve end position (Px#); and the vehicle speed is controlled on the bases of the result (ΔVx) of comparison between the first target vehicle speed (Vt1) and the actual speed (Vxa) of the vehicle. By virtue of this, a target value for the vehicle speed control can be changed in accordance with a pattern which is set in consideration of the shape of the constant curvature degree section having the largest degree of curvature and which matches a driver's intention. In this case, the changing pattern of the first target vehicle speed can be set, for example, such that the deceleration of the vehicle falls within a proper range (or does not exceed a predetermined value) (that is, in consideration of the deceleration of the vehicle).

Alternatively, during the vehicle speed control, a second target vehicle speed (Vt2) of the vehicle is computed on the basis of the in-curve constant curvature degree (Rm#), the curve end position (Px#), and the straight-line end position (Py#); and the vehicle speed is controlled on the bases of the result (ΔVx) of comparison between the second target vehicle speed (Vt2) and the actual speed (Vxa) of the vehicle. In general, in the vehicle speed control, the end point of the approaching straight section (Cr#) (that is, the start point of the approaching transition curve section (see the point Ci in FIG. 9 and the point Pyb in FIG. 4) is used as the straight-line end position (Py#).

In general, the changing degree of curvature within the approaching transition curve section can be acquired on the basis of the start and end points of the approaching transition curve section and the constant degree of curvature of the constant curvature degree section following the approaching transition curve section. Accordingly, the target value for the vehicle speed control can be changed in accordance with a pattern which is set in consideration of the shape of the approaching transition curve section and which matches a driver's intention. In this case, the changing pattern of the second target vehicle speed can be set, for example, such that the lateral acceleration of the vehicle during traveling in the approaching transition curve section falls within a proper range (or does not exceed a predetermined value) (that is, in consideration of the lateral acceleration of the vehicle).

The vehicle speed control may be performed such that a smaller one of the first target vehicle speed (Vt1) and the second target vehicle speed (Vt2) is determined to be used as a final target vehicle speed (Vt), and the vehicle speed is controlled on the basis of the result (ΔVx) of comparison between the final target vehicle speed (Vt) and the actual speed (Vxa) of the vehicle. With this, the target value for the vehicle speed control can be changed in accordance with a pattern which is set such that the deceleration of the vehicle does not exceed a proper range (or a predetermined value) and the lateral acceleration of the vehicle during traveling in the approaching transition curve section does not exceed a proper range (or a predetermined value). In other words, the changing pattern of the target value for the vehicle speed control can be set in consideration of both the deceleration and lateral acceleration of the vehicle.

Furthermore, preferably, the above-described speed control apparatus according to the present invention further comprises determination means (B9) for determining, on the basis of the position (Pvh) of the vehicle and the straight-line end position (Py#), whether or not the vehicle speed control is to be permitted, and setting an output signal therefrom to a permission state (Scv, Ssg=1) for permitting execution of the vehicle speed control or a prohibition state (Scv, Ssg=0) for prohibiting execution of the vehicle speed control depending on the result of the determination, wherein the control means (B8) is configured to execute the vehicle speed control when the output signal is in the permission state, and not to execute the vehicle speed control when the output signal is in the prohibition state. In this case as well, the end point of the approaching straight section (Cr#) (that is, the start point of the approaching transition curve section (see the point Ci in FIG. 9 and the point Pyb in FIG. 4) can be used as the straight-line end position (Py#).

In this case, the determination means (B9) changes its output signal (Scv) from the prohibition state (Scv=0) to the permission state (Scv=1) when the position (Pvh) of the vehicle passes through the straight-line end position (Py#).

With this configuration, the determination as to whether to execute the vehicle speed control is made in consideration of the start point of the approaching transition curve section, which is the entrance of the curve. Accordingly, the vehicle speed control can be started at a proper position which matches a driver's intention.

In particular, in the case where turning amount acquisition means (B10) for acquiring a turning amount (Tca, Yra) representing the degree of turning motion of the vehicle is provided, the determination means (B9) may be configured to start the computation of a cumulative value (Ha, Ya) of the turning amount (Tca, Yra) on the basis of the position (Pvh) of the vehicle and the straight-line end position (Py#), and change its output signal (Ssg) from the prohibition state (Ssg=0) to the permission state (Ssg=1) when the cumulative value (Ha, Ya) exceeds a predetermined value (ha1).

In this case, the computation of the cumulative value of the turning amount may be started when the vehicle passes through the straight-line end position (Py#), after the vehicle passes through the straight-line end position (Py#), or when the vehicle passes through a position shifted a predetermined amount from the straight-line end position (Py#) toward the near side (toward the vehicle).

By virtue of this configuration, it is possible to suppress occurrence of a situation where the vehicle speed control is started needlessly, for example, in the case where a road has been modified (e.g., a curved road has been modified into a straight road), and the road shape based on road information stored in the navigation apparatus does not coincide with the actual road shape.

DESCRIPTION OF THE PREFERRED EMBODIMENTS

Figure 1:
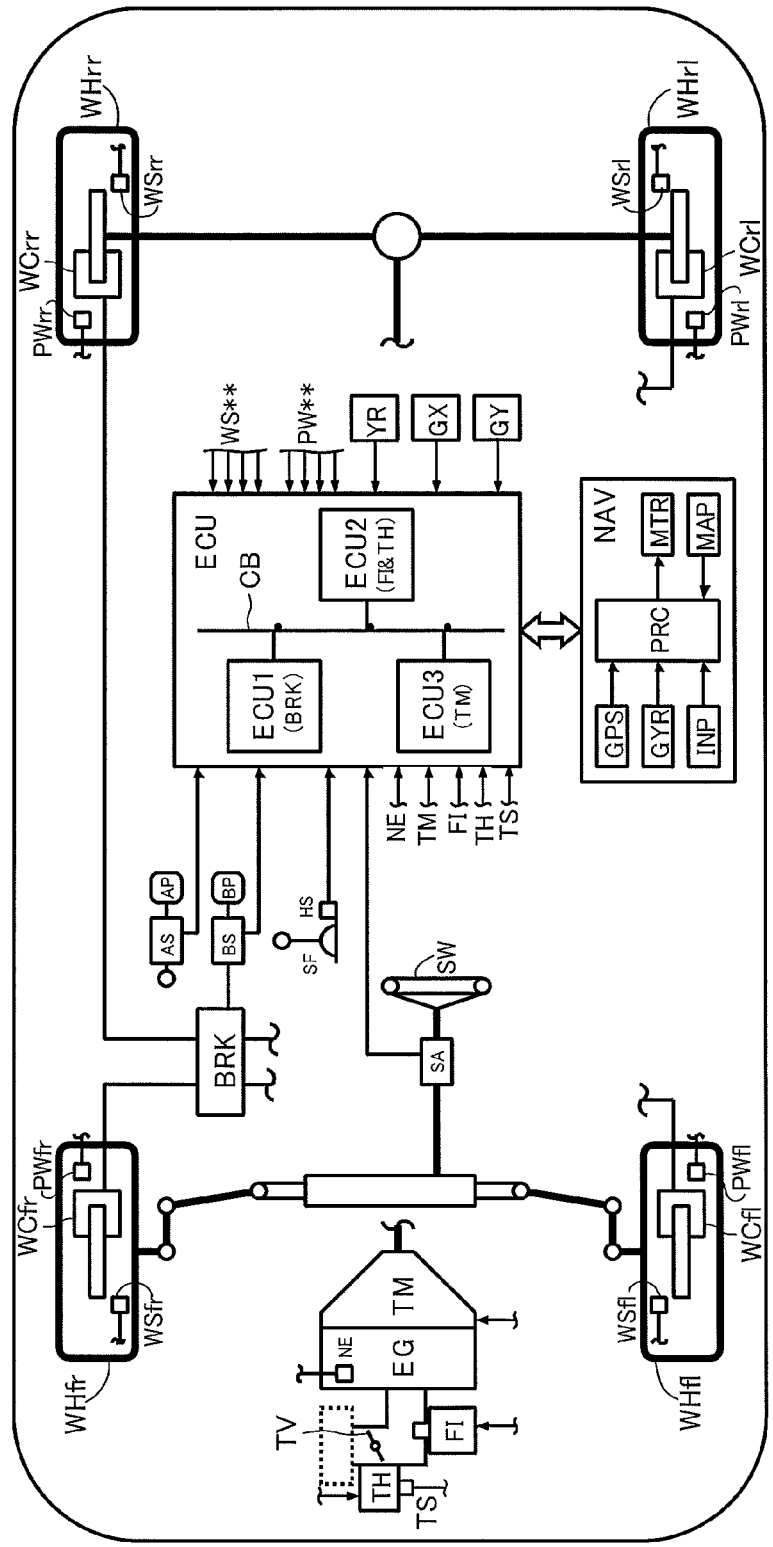
FIG. 1 is a schematic diagram of a vehicle on which a speed control apparatus for a vehicle according to an embodiment of the present invention is mounted.

A speed control apparatus for a vehicle according to an embodiment of the present invention will now be described with reference to the drawings.
(Structure)
FIG. 1 schematically shows the structure of a vehicle on which the speed control apparatus according to the embodiment of the present invention (hereinafter referred to as the "present apparatus") is mounted. The present apparatus includes an engine EG, which is a power source of the vehicle, an automatic transmission TM, a brake actuator BRK, an electronic control unit ECU, and a navigation apparatus NAV.

For example, the engine EG is an internal combustion engine. A throttle actuator TH adjusts the opening of a throttle valve TV in response to operation of an accelerator pedal (acceleration operation member) AP by a driver. A fuel injection actuator FI (injector) injects fuel in an amount in proportion to the intake air amount adjusted in accordance with the opening of the throttle valve TV. Thus, the engine EG outputs an output torque corresponding to the amount of operation of the accelerator pedal AP by the driver.

The automatic transmission TM is a multi-stage automatic transmission having a plurality of gear stages or a non-stage automatic transmission having no gear stage. The automatic transmission TM can automatically (without needing operation of a shift lever (shift operation member) SF by the driver) change the reduction ratio (rotational speed of an output shaft of the engine EG (=an input shaft of the transmission TM)/rotational speed of an output shaft of the transmission TM) in accordance with the operation state of the engine EG and the position of the shift lever SF.

The brake actuator BRK has a known structure, and includes a plurality of solenoid valves, a hydraulic pump, a motor, etc. In a non-controlled mode, the brake actuator BRK supplies wheel cylinders WC of wheels WH with brake pressure (brake hydraulic pressure) corresponding to an operation of a brake pedal BP (brake operation member) by the driver. In a controlled mode, the brake actuator BRK can individually adjust the braking pressures within the wheel cylinders WC** independently of the operation of the brake pedal BP (and the operation of the accelerator pedal AP).

Notably, "" suffixed to various symbols, etc. is a generic symbol representing "fl," "fr," etc. which denote the respective positions of the wheels. "fl" refers to front left, "fr" refers to front right, "rl" refers to rear left, and "rr" refers to rear right. For example, the wheel cylinders WC represent the front left wheel cylinder WCfl, the front right wheel cylinder WCfr, the rear left wheel cylinder WCrl, and the rear right wheel cylinder WCrr.

The present apparatus includes wheel speed sensors WS for detecting wheel speeds Vw of the wheels WH; brake pressure sensors PW for detecting brake pressures within the wheel cylinders WC**; a steering wheel angle sensor SA for detecting rotation angle of the steering wheel SW (from its neutral position); a yaw rate sensor YR for detecting yaw rate of the vehicle body; a longitudinal acceleration sensor GX for detecting acceleration (deceleration) in a front-rear direction of the vehicle body (hereinafter referred to as the "longitudinal direction); a lateral acceleration sensor GY for detecting acceleration in the lateral direction of the vehicle body; an engine speed sensor NE for detecting rotational speed of the output shaft of the engine EG; an accelerating operation amount sensor AS for detecting the amount of operation of the accelerator pedal AP; a brake operation amount sensor BS for detecting the amount of operation of the brake pedal BP; a shift position sensor HS for detecting the position of the shift lever SF; and a throttle valve opening sensor TS for detecting the opening of the throttle valve TV.

The electronic control unit ECU is a microcomputer for electronically controlling a power train system and a chassis system. The electronic control unit ECU is electrically connected to, or can communicate through a network with, the above-described various actuators, the above-described various sensors, and the automatic transmission TM. The electronic control unit ECU is composed of a plurality of control units (ECU1 to ECU3) connected together via a communication bus CB.

The ECU1 within the electronic control unit ECU is a wheel brake control unit that controls the brake actuator BRK on the basis of signals from the wheel speed sensors WS**, the longitudinal acceleration sensor GX, the lateral acceleration sensor GY, the yaw rate sensor YR, etc., to thereby execute brake pressure control (wheel brake control), such as antiskid control (ABS control), traction control (TCS control), and vehicle stability control (ESC control), which are well known.

The ECU2 within the electronic control unit ECU is an engine control unit that controls the throttle actuator TH and the fuel injection actuator FI on the basis of signals from the accelerating operation amount sensor AS, etc., to thereby control the output torque of the engine EG (engine control).

The ECU3 within the electronic control unit ECU is an automatic transmission control unit that controls the automatic transmission TM on the basis of signals from the shift position sensor HS, etc., to thereby execute reduction ratio control (transmission control).

The navigation apparatus NAV includes a navigation processing apparatus PRC, which is electrically connected to vehicle position detection means (a global positioning system) GPS, a yaw rate gyro GYR, an input section INP, a storage section MAP, and a display section (display) MTR. The navigation apparatus NAV is electrically connected to, or can communicate wireless with, the electronic control unit ECU.

The vehicle position detection means GPS can detect the position (latitude, longitude, etc.) of the vehicle by one of well known methods utilizing positioning signals from satellites. The yaw rate gyro GYR can detect angular speed (yaw rate) of the vehicle body. The input section INP receives driver's operations associated with navigation functions. The storage section MAP stores various pieces of information, such as map information and road information.

The navigation processing apparatus PRC comprehensively processes the signals from the vehicle position detection means GPS, the yaw rate gyro GYR, the input section INP, and the storage section MAP, and displays the processing results (information related to the navigation function) on the display section MTR.
(Curve Deceleration Control)
Now, there will be described curve deceleration control (vehicle speed control) executed by the present apparatus configured as described above. The curve deceleration control is control for decelerating the vehicle, irrespective of driver's accelerating/decelerating operation (operation of AP or BP) (when accelerating/decelerating operation is not performed), to thereby enable the vehicle to properly pass through the curve. Deceleration of the vehicle is achieved through at least one of reduction of the output of the engine EG, downshift of the transmission TM, and wheel braking.

The curve deceleration control will now be described with reference to a functional block diagram shown in FIG. 2. First, vehicle speed acquisition means B1 acquires the actual speed Vxa of the vehicle. The actual vehicle speed Vxa is computed by a known method on the basis of the detection signals (wheel speeds) Vw from the wheel speed sensors WS. Vehicle position acquisition means B2 acquires the present position Pvh of the vehicle. The vehicle position Pvh is acquired by use of the global positioning system (GPS).

Road position data acquisition means B3 acquires data representing the positions of a plurality of points on a road located ahead of the vehicle traveling on the road (hereinafter the data will be referred to as "position data sets Nd[n]"). The position data sets Nd[n] are previously memorized and stored in a storage media (a hard disk or the like of the storage section MAP). Each position data set Nd[n] can be stored as information representing the latitude and longitude of the corresponding point. The points corresponding to the position data sets Nd[n] will be referred to as "node points Nd[n]."

Curvature degree acquisition means B4 acquires a degree of curvature Rc[n] of the road at each node point Nd[n] located ahead of the vehicle. As the degree of curvature (the degree of curve bend) Rc[n], the radius of curvature Rc, the curvature (the reciprocal of the radius) 1/Rc, or the like can be used. The degree of curvature Rc[n] is stored in the storage media (a hard disk or the like of the storage section MAP) in such a manner that it is related to the corresponding position data set (node point) Nd[n].

Figure 3:
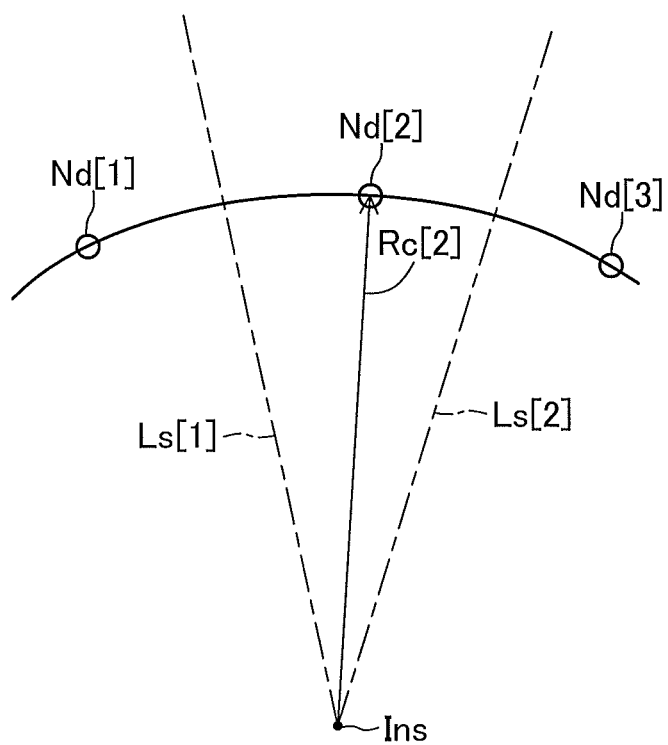
FIG. 3 is an illustration used for describing a method of computing the degree of curvature of a road at each node point.

Next, a method of computing the degree of curvature Rc[n] at a node point from three neighboring position data sets (node points) Nd[n] will be described with reference to FIG. 3. As shown in FIG. 3, first, of the node points Nd[n], a first node point Nd[1], a second node point Nd[2], and a third node point Nd[3] are selected. Although these node points to be selected are not required to be directly adjacent to each other, they are close to one another.

A first perpendicular bisector Ls[1] of a line whose opposite ends are located at the first node point Nd[1] and the second node point Nd[2] is computed from the first node point Nd[1] and the second node point Nd[2]. Similarly, a second perpendicular bisector Ls[2] of a line whose opposite ends are located at the second node point Nd[2] and the third node point Nd[3] is computed from the second node point Nd[2] and the third node point Nd[3].

Subsequently, an intersection Ins between the first perpendicular bisector Ls[1] and the second perpendicular bisector Ls[2] is determined. The distance between the intersection Ins and the second node point Nd[2] (=the radius of curvature) is computed as the degree of curvature Rc[2] at the second node point Nd[2]. By use of the above-described method, the degree of curvature Rc[2] at the second node point Nd[2] is acquired on the basis of the first, second, and third node points Nd[1], Nd[2], and Nd[3].

The processing of acquiring the degree of curvature at the second node point Nd[2] by the above-described method is repeated, while a different one of the plurality of node points Nd[n] is selected as the second node point Nd[2]. Thus, the degree of curvature (the degree of bend) Rc[n] at each of the plurality of points Nd[n] is acquired. Employment of this method eliminates the necessity of previously storing data representing the degree of curvature at each of the plurality of node points Nd[n]. Accordingly, the road information stored in the storage section MAP can be simplified.

Figure 4:
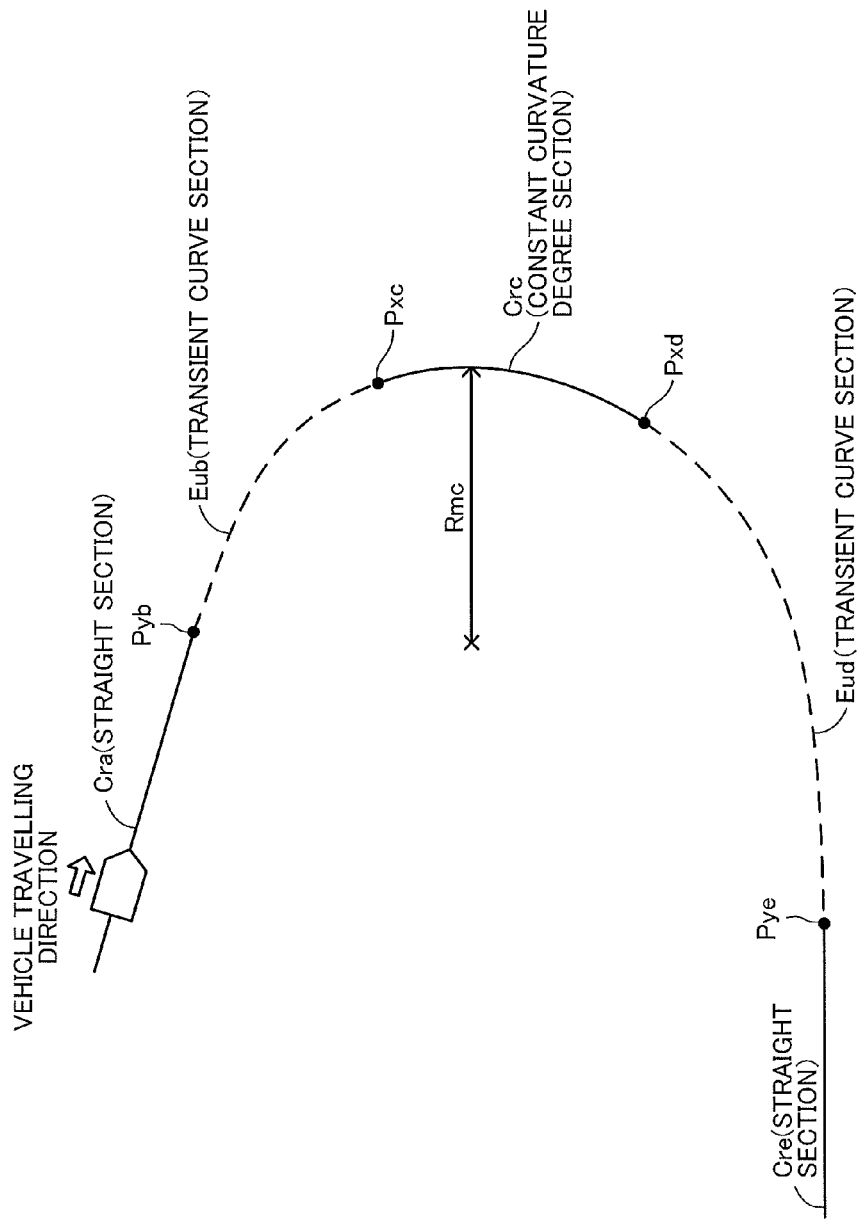
FIG. 4 is an illustration showing a typical shape of a road including a curve.
Figure 5:
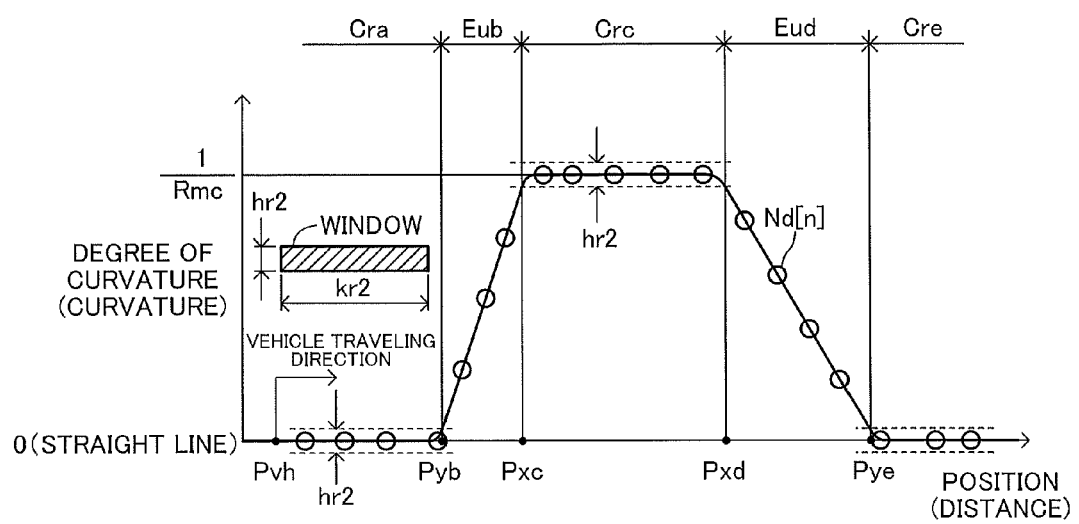
FIG. 5 is a graph showing the relation between position and curvature degree for the road shown in FIG. 4.

Description will be continued with reference to FIGS. 4 and 5. FIG. 4 shows a typical shape of a road including a curve. FIG. 5 shows the relation between the degree of curvature and position of each node point Nd[n] of the road shown in FIG. 4. In FIG. 5, the curvature (the reciprocal of radius) 1/Rc is used as the degree of curvature (the magnitude of bend) Rc[n] at each node point Nd[n].

Constant curvature degree section identification means B5 identifies constant curvature degree sections Cr#, in which the degree of curvature Rc[n] is constant, on the basis of the plurality of position data sets (node points) Nd[n] located ahead of the vehicle and the degrees of curvature Rc[n] corresponding thereto. The constant curvature degree sections Cr# include not only a section of the curve in which the degree of curvature Rc[n] is constant, but also straight sections. In the following description, a section of the curve in which the degree of curvature Rc[n] is constant may be referred to as an "in-curve constant curvature degree section." The "#" suffixed to various symbols or the like is a generic symbol representing single alphabetical letters.

Each of the identified constant curvature degree sections Cr# is identified as a straight section or an in-curve constant curvature degree section. In the example shown in FIGS. 4 and 5, sections Cra, Crc, and Cre are identified as the constant curvature degree sections Cr#; and, of these sections, the sections Cra and Cre are each identified as a straight section, and the section Crc is identified as an in-curve constant curvature degree section. The method for identification will now be described.

Each constant curvature degree section Cr# is identified on the basis of a change in the degree of curvature Rc[n] with advancement of the position among the points (node points) Nd[n] corresponding to the position data sets. Specifically, a section in which the ratio of the difference in the degree of curvature Rc[n] between two adjacent node points Nd[n] to the distance therebetween is not greater than a predetermined value hr1, and this state continues throughout the section, can be identified as the constant curvature degree section Cr#.

Furthermore, a section whose distance is equal to or greater than a predetermined distance kr2 and in which the difference (curvature degree variation width) between the maximum value and the minimum value of the degrees of curvature Rc[n] at a plurality of successive node points Nd[n] contained in the section is equal to or less than a predetermined value hr2 is identified as a constant curvature degree section Cr#. In this case, scanning is performed within a window corresponding to the section distance kr2 and the curvature degree variation width hr2 (see FIG. 5), and a determination as to whether or not the window contains a plurality of successive position data sets (node points) Nd[n] is made, while the position of the window is changed. As a result, the constant curvature degree sections Cr# can be identified. As described above, the constant curvature degree sections Cr# are identified and acquired on the basis of the plurality of position data sets (node points) Nd[n] and the degree of curvature Rc[n] at each point (node point). Therefore, even for a curve along which the vehicle travels for the first time, the constant curvature degree sections Cr# can be identified and acquired.

Constant curvature degree acquisition means B6 acquires a constant degree of curvature Rm# (more specifically, a constant radius of curvature Rm# or a constant curvature 1/Rm#) within each constant curvature degree section Cr#. For example, the constant degree of curvature Rm# may be the average or the like of the degrees of curvature Rc[n] of the plurality of node points Nd[n] contained in the constant curvature degree section Cr#. On the basis of this constant degree of curvature Rm#, the constant curvature degree section Cr# is identified as an in-curve constant curvature degree section or a straight section. Specifically, when the constant radius of curvature Rm# is greater than a predetermined value rc1 (or the constant curvature 1/Rm# is less than a predetermined value kc1 (=1/rc1)), the constant curvature degree section Cr# is identified as a straight section; and when the constant radius of curvature Rm# is not greater than the predetermined value rc1, the constant curvature degree section Cr# is identified as an in-curve constant curvature degree section. In the following description, the constant degree of curvature Rm# of the in-curve constant curvature degree section may be referred to as the "in-curve constant curvature degree."

End position determination means B7 determines the end positions of each constant curvature degree section Cr#. Specifically, in the case where the constant curvature degree section Cr# is an in-curve constant curvature degree section, its end positions are determined as curve end positions Px#; and, when the constant curvature degree section Cr# is a straight section, its end positions are determined as straight-line end positions Py#. Notably, the above-described "identification of the constant curvature degree section Cr# as an in-curve constant curvature degree section or a straight section" may be executed in this end position determination means B7.

In the example shown in FIGS. 4 and 5, points Pxc and Pxd are determined as the curve end positions Px#, and points Pyb and Pye are determined as the straight-line end positions Py#. The curve end positions Pxc and Pxd correspond to the start and end points of the in-curve constant curvature degree section Crc, respectively. In the curve shown in FIGS. 4 and 5, the in-curve constant curvature degree section Crc has the greatest degree of curvature (the largest curvature, the smallest radius of curvature). Accordingly, the curve end positions Pxc and Pxd can be said to be the positions of opposite ends of a section which is the greatest in the degree of curvature within the curve shown in FIGS. 4 and 5. The straight-line end positions Pyb and Pye correspond to the end point of the approaching straight section Cra (i.e., curve entrance), and the start point of the departing straight section Cre (i.e., curve exit), respectively.

The curve end positions Px# and the straight-line end positions Py# may be node points themselves which are located at opposite ends of the plurality of node points Nd[n] contained in the corresponding constant curvature degree section Cr#, or points near the node points Nd[n] at the opposite ends. For example, the points near the node points Nd[n] at the opposite ends may be points determined through interpolation between the node points Nd[n] at the opposite ends and node points Nd[n] adjacent thereto (that is, node points Nd[n] not contained in the corresponding constant curvature degree section).

Vehicle speed control means B8 executes curve deceleration control so as to adjust the vehicle speed so that the vehicle can stably travel along the curve located ahead of the vehicle. The vehicle speed control means B8 is composed of computation blocks B81 to B84. In the following, the computation blocks B81 to B84 will be described on a block-by-block basis. In the following description, unless otherwise stated, the "in-curve constant curvature degree section" may be simply referred to as the "constant curvature degree section," and the "in-curve constant curvature degree" may be simply referred to as the "constant curvature degree."

The target vehicle speed computation block B81 determines, on the basis of the vehicle position Pvh acquired by the vehicle position acquisition means B2, a reference constant curvature degree section which is the closest to the vehicle among the in-curve constant curvature degree sections Cr# which are present on the road on which the vehicle travels and which are located ahead of the vehicle. In the following description, unless otherwise stated, the constant curvature degree Rm#, the curve end position Px#, and the straight-line end position Py# relate to the curve containing the reference constant curvature degree section.

The target vehicle speed computation block B81 computes a first target vehicle speed Vt1 for properly passing through the curve on the basis of the vehicle position Pvh acquired by the vehicle position acquisition means B2, the constant curvature degree Rm# (the radius of curvature) acquired by the constant curvature degree acquisition means B6, and the curve end position Px# determined by the end position determination means B7. Furthermore, the target vehicle speed computation block B81 computes a second target vehicle speed Vt2 for properly passing through the curve on the basis of Pvh, Rm#, Px#, and the straight-line end position Py# determined by the end position determination means B7. Moreover, the target vehicle speed computation block B81 computes a final target vehicle speed Vt from Vt1 and Vt2. In the following, computation of Vt1, Vt2, and Vt in the target vehicle speed computation block B81 will be described in detail with reference to FIG. 6.

Figure 6:
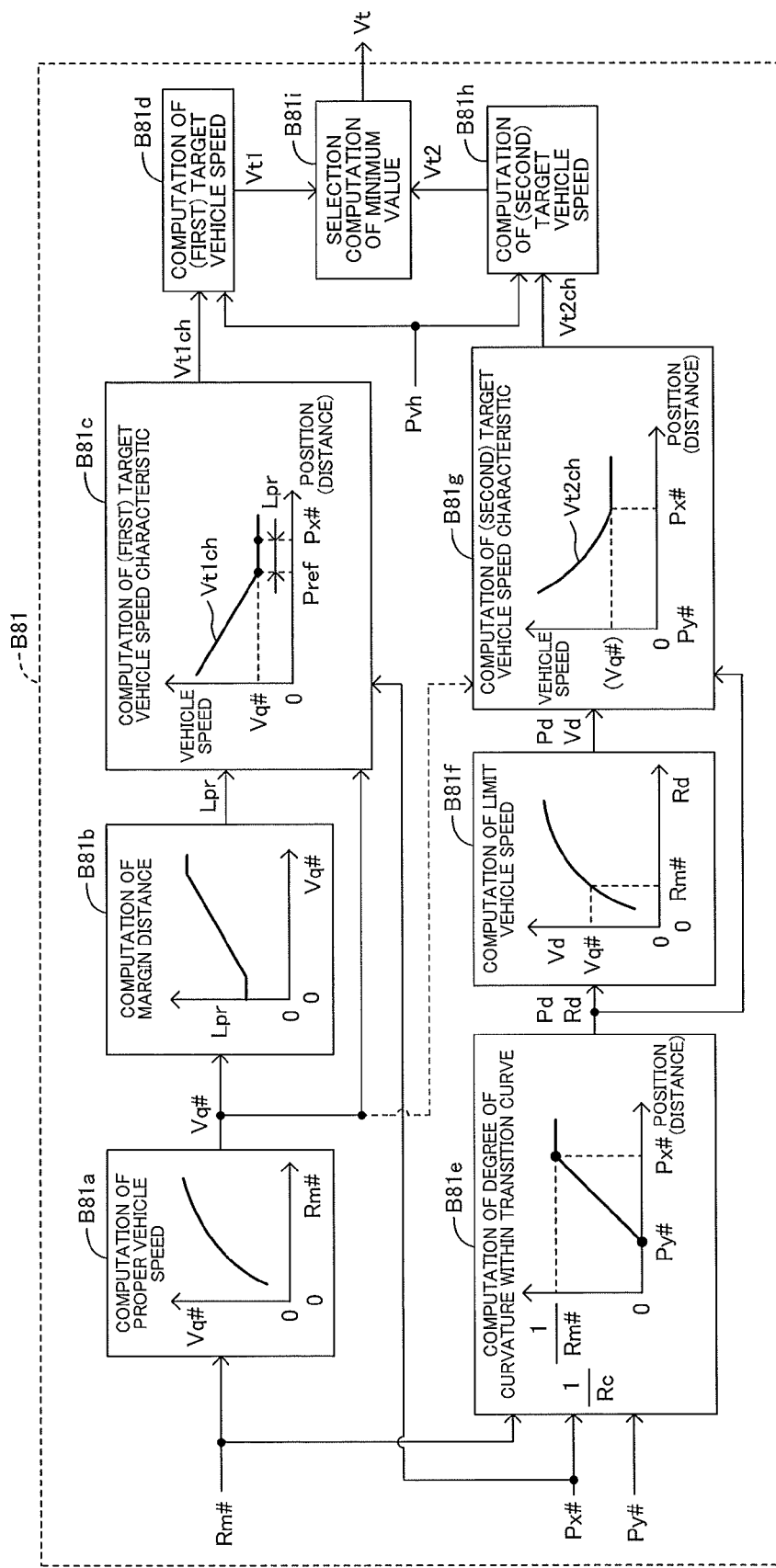
FIG. 6 is a functional block diagram of a target vehicle speed computation block shown in FIG. 2.

As shown in FIG. 6, in a proper vehicle speed computation block B81a, a proper vehicle speed Vq# for stably passing through the reference constant curvature degree section Cr# is computed on the basis of Rm# of the reference constant curvature degree section Cr#. The greater the value of Rm# (the radius of curvature), the greater the computed value of Vq#. In a margin distance computation block B81b, a margin distance Lpr is computed on the basis of Vq#. The greater the value of Vq#, the greater the computed value of Lpr. Lpr is used to determine a reference position Pref at which Vq# is to be achieved.

In a first target vehicle speed characteristic computation block B81c, a first target vehicle speed computation characteristic Vt1ch is determined. Vt1ch is a position vs. vehicle speed characteristic and which is used for computation of Vt1. The above-mentioned reference position Pref (a point at which Vq# is achieved) is determined on the basis of the curve end position Px# of the reference constant curvature degree section Cr# (the start point of Cr#) and Lpr. Pref is set to be closer to the vehicle by the margin distance Lpr in relation to the end position Px# of the reference constant curvature degree section Cr#.

Vt1ch is determined on the basis of Pref and Vq#. Vt1ch is set such that the vehicle speed decreases at a deceleration Gxo (e.g., a constant deceleration) toward Pref, and the vehicle speed becomes equal to Vq# at Pref. The position data sets Nd[n] and the vehicle position Pvh of a road include errors. However, such errors can be compensated by means of offsetting the reference position Pref toward the vehicle by an amount corresponding to the margin distance Lpr as described above. Pref can be set to the curve end position Px# itself (that is, Lpr can be set to 0).

In a first target vehicle speed computation block B81d, a target vehicle speed Vt1 corresponding to the vehicle position Pvh is computed at predetermined intervals from Pvh and Vt1ch computed in the block B81c. That is, as the vehicle position Pvh changes with time, the target vehicle speed Vt1 also changes accordingly.

As described above, in the present example, the changing pattern of the target vehicle speed Vt1 is set such that the vehicle decelerates at a proper deceleration (specifically, the above-mentioned Gxo) (that is, in consideration of the deceleration of the vehicle).

In a transition curve section curvature degree computation block B81e, there is computed the degree of curvature Rd at the position Pd within a transition curve section Eu# whose opposite ends are Px# and Py#, on the basis of the curve end position Px# of the reference constant curvature degree section Cr# (the start point of Cr#), the straight-line end position Py# (the end point of the approaching straight section), and the constant curvature degree Rm#. In the computation of the degree of curvature Rd, the transition curve section Eu# is assumed to be composed of a clothoid curve. That is, in the transition curve section Eu#, the degree of curvature Rd at the position Pd is computed under the assumption that the curvature (the reciprocal of the radius of curvature) 1/Rd changes linearly with the change (distance) of the position Pd.

In a limit vehicle speed block B81$f$, a limit vehicle speed Vd is computed on the basis of Rd. The greater the value of Rd (the radius of curvature), the greater the computed value of Vd. For example, Vd is set to $\sqrt{(Rd \cdot Gyo)}$. Gyo represents a proper lateral acceleration (for example, a constant value) of the vehicle.

In a second target vehicle speed characteristic computation block B81$g$, a second target vehicle speed computation characteristic Vt2ch is determined. Vt2ch is a position vs. vehicle speed characteristic which is used for computation of Vt2. Vt2ch is determined on the basis of Pd and Vd. Vt2ch is set such that the vehicle speed decreases in accordance with the limit vehicle speed Vd within the transition curve section Eu#, and the vehicle speed becomes Vq# at Px#.

In a second target vehicle speed computation block B81$h$, a target vehicle speed Vt2 corresponding to the vehicle position Pvh is computed at predetermined intervals from Pvh and Vt2ch computed in the block B81$g$. That is, as the vehicle position Pvh changes with time, the target vehicle speed Vt2 also changes accordingly.

As described above, in the present example, the changing pattern of the target vehicle speed Vt2 is set such that, during travelling in the approaching transition curve section Eu#, a proper lateral acceleration (specifically, the above-mentioned Gyo) acts on the vehicle (that is, in consideration of the lateral acceleration of the vehicle).

In a minimum value section computation block B81$i$, the smaller one of Vt1 and Vt2 is determined to be used as a final target vehicle speed Vt. With this, the changing pattern of the target vehicle speed Vt can be set such that the deceleration of the vehicle does not exceed a proper value (the above-mentioned Gxo (e.g., a preset, predetermined value)), and the lateral acceleration of the vehicle during traveling in the approaching transition curve section Eu# does not exceed a proper value (the above-mentioned Gyo (e.g., a preset, predetermined value)). In there words, the changing pattern of the target vehicle speed Vt is properly set in consideration of both the deceleration and lateral acceleration of the vehicle.

Notably, one of Vt1 and Vt2 may be omitted. In the case where Vt1 is omitted (that is, in the case where the blocks B81$a$ to B81$d$ are omitted), Vt2 is computed as the final target vehicle speed Vt. In the case where Vt2 is omitted (that is, in the case where the blocks B81$e$ to B81$h$ are omitted), Vt1 is computed as the final target vehicle speed Vt. In the above, the computation in target vehicle speed computation block B81 of the vehicle speed control means B8 of FIG. 2 has been described in detail.

Figure 2:
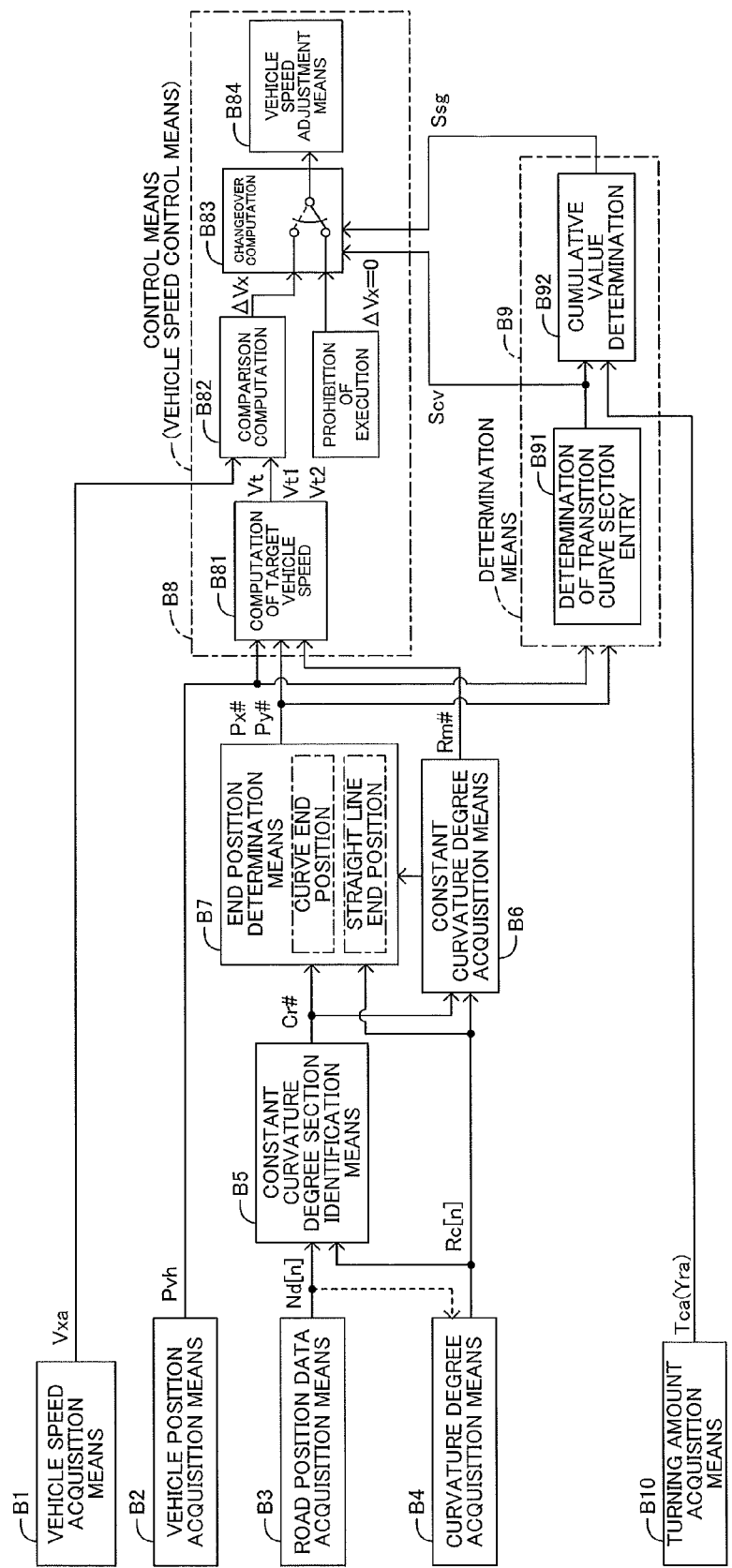
FIG. 2 is a functional block diagram of the apparatus shown in FIG. 1 when the apparatus executes vehicle speed control.

Referring back to the vehicle speed control means B8 of FIG. 2, in a comparison computation block B82, one of the target vehicle speeds Vt1, Vt2, and Vt is compared with the actual speed of the vehicle (actual vehicle speed) Vxa acquired by the vehicle speed acquisition means B1. Specifically, a deviation ΔVx of Vxa from one of Vt1, Vt2, and Vt (ΔVx=Vxa−Vt, etc.) is computed. A changeover computation block B83 will be described later.

Vehicle speed adjustment means B84 adjusts the vehicle speed on the basis of the comparison result ΔVx. The Vehicle speed adjustment means B84 may be means for applying frictional braking (wheel brake) and/or so-called engine braking (downshift of TM) to the vehicle in order to decelerate the vehicle (even when the driver does not perform accelerating or decelerating operation), or may be means for limiting the opening of the throttle valve TV and/or the injection amount of the injector FI in order to restrict acceleration of the vehicle.

For example, the vehicle speed adjustment means B84 operates such that, when ΔVx is positive, ΔVx becomes zero or below zero (the actual vehicle speed becomes equal to or less than the target vehicle speed). That is, the condition for starting the curve deceleration control is satisfied when ΔVx becomes positive (when the actual vehicle speed Vxa exceeds the target vehicle speed (Vt, etc.)). As a result of execution of the curve deceleration control by the vehicle speed adjustment means B84, the vehicle is decelerated, and acceleration is restricted. In the above, the vehicle speed control means B8 has been described.

Determination means B9 determines whether or not the curve deceleration control can be executed, and sets its output signal to a permission state for permitting execution of the curve deceleration control or a prohibition state for prohibiting execution of the curve deceleration control, depending on the result of the determination. In the case where the output signal is in the prohibition state for prohibiting execution of the curve deceleration control, the curve deceleration control is not started, even if the relation between the actual vehicle speed Vxa and one of the target vehicle speeds Vt1, Vt2, and Vt satisfies the above-described condition for starting the curve deceleration control (the actual vehicle speed is greater than the target vehicle speed). Meanwhile, only in the case where the output signal is in the permission state for permitting execution of the curve deceleration control, the curve deceleration control is started when the above-mentioned "condition for starting the curve deceleration control" is satisfied.

More specifically, in a transition curve section entry determination block B91, a determination as to whether or not the vehicle has entered the approaching transition curve section Eu# of the curve (that is, whether or not the vehicle has passed through Py#) is made on the basis of the vehicle position Pvh and the straight-line end position Py#. When the vehicle is determined to have entered the approaching transition curve section Eu#, a signal (control flag) Scv, which has been maintained at a prohibition state (Scv=0), is changed to a permission state (Scv=1). In the example shown in FIGS. 4 and 5, the control flag Scv is changed from "0" to "1" when the vehicle passes through the point Pyb.

In response to the changing of the control flag Scv from "0" to "1," the state of the changeover computation block B83 of the vehicle speed control means B8 is switched from a state for prohibiting execution of the curve deceleration control (ΔVx=0) to a state for receiving the comparison result (ΔVx) from the comparison computation block B82. As a result, output of the comparison result (ΔVx) from the comparison computation block B82 to the speed adjustment means B84 is started. In the case where the above-mentioned "condition for starting the curve deceleration control" is already satisfied at this point in time, the curve deceleration control is started immediately. In the case where the "condition for starting the curve deceleration control" is not satisfied, the curve deceleration control is started later when the "condition for starting the curve deceleration control" is satisfied.

By virtue of the above-described operation, the curve deceleration control is permitted only when the vehicle position is located within the curve. That is, execution of the curve deceleration control is prohibited while the vehicle is traveling in the approaching straight section of the road. Accordingly, in the case where the target vehicle speed Vt1, Vt2, or Vt is erroneously computed or a like case, unnecessary execution of the curve deceleration control can be suppressed. As described above, the processing of the determination means B9 can improve reliability associated with execution of the curve deceleration control.

Furthermore, turning amount acquisition means B10 for acquiring a turning amount Tca of the vehicle is provided. The turning amount Tca represents the degree of turning motion of the vehicle. Specifically, Tca is a value based on one or more of steering wheel operation angle θsw, steering angle δfa of steerable wheels, actual yaw rate Yra, and actual lateral acceleration Gya. Hereinafter, the steering wheel operation angle θsw and the steering angle δfa of the steerable wheels will be collectively referred to as a steering angle Sa. The turning amount Tca is Sa, Yra, or Gya itself, or a value computed on the basis of Sa, Yra, or Gya.

Computation for integrating Tca from zero (cumulative computation) is started at a point in time when, as described above, the vehicle is determined to have passed through the straight-line end position Py# (that is, to have entered Eu#) in the transition curve section entrance determination block B91. After that, the cumulative value Ha of Tca is computed periodically. When the cumulative value Ha exceeds a predetermined value ha1, a signal (control flag) Ssg, which has been maintained at a prohibition state (Ssg=0), is changed to a permission state (Ssg=1).

In an example case where the actual yaw rate Yra is used as Tca, computation of a yaw angle Ya (an azimuth angle representing the orientation of the vehicle), which is a cumulative value of Yra, is started when the vehicle passes through Py# (the end point of the approaching straight section). When the value of Ya exceeds a predetermined value ha1, the control flag Ssg is changed from a prohibition state (Ssg=0) for prohibiting execution of the curve deceleration control to a permission state (Ssg=1) for permitting execution of the curve deceleration control. As a result, as in the case where the above-mentioned control flag Scv is changed from "0" to "1," the state of the changeover computation block B83 of the vehicle speed control means B8 is switched from the state for prohibiting execution of the curve deceleration control (ΔVx=0) to the state for receiving the comparison result (ΔVx) from the comparison computation block B82.

As described above, the determination as to whether or not the curve deceleration control can be executed is made on the basis of Tca. Therefore, it is possible to suppress unnecessary execution of the curve deceleration control, for example, in the case where a road has been modified (e.g., a curved road has been modified into a straight road), and the road shape based on road information stored in the storage section MAP does not coincide with the actual road shape.

In place of the actual yaw rate Yra, at least one of a yaw rate Yre1 computed on the basis of the vehicle speed Vxa and the steering angle Sa (the steering wheel operation angle θsw, the steerable wheel steering angle δfa), a yaw rate Yre2 computed on the basis of the difference between the speeds of left and right wheels, and a yaw rate Yre3 computed on the basis of the vehicle speed Vxa and the lateral acceleration Gya can be used as the turning amount Tca.

Notably, in the above-described embodiment, the computation of the cumulative value Ha of the turning amount Tca from zero is started when the vehicle passes through the straight-line end position Py#. However, the computation of the cumulative value Ha may be started after the vehicle passes through the straight-line end position Py#. Alternatively, the computation of the cumulative value Ha may be started when the vehicle passes a position (a position within the straight section) shifted a predetermined amount from the straight-line end position Py# toward the near side (toward the vehicle), because of the following reason. Since Pvh, etc. contain errors, the cumulation of Tca from zero must be started before Py#. However, since the section before Py# is a straight section, and, even when the computation of the cumulative value Ha is started within the straight section, the value of Ha is maintained zero over the straight section.

As described above, in the speed control apparatus according to the embodiment of the present invention, data (information of latitude and longitude) representing the positions of a plurality of positions (node points) Nd[n] on a road located ahead of the vehicle traveling on the road are obtained; and the degree of curvature (the degree of curve bend) Rc[n] of the road at each node point Nd[n] is computed. On the basis of the degree of curvature Rc[n], the in-curve constant curvature degree section Cr# (the suffix "#" is a generic symbol representing single alphabetical letters) is identified, and the in-curve constant curvature degree Rm# and the curve end positions Px# of the in-curve constant curvature degree section Cr# are determined. Then, on the basis of the actual vehicle speed Vxa of the vehicle, the in-curve constant curvature degree Rm#, and the curve end positions Px# (even when the driver does not perform any accelerating or decelerating operation), the curve deceleration control is executed so as to cause the vehicle to properly pass through the curve.

In the case of a typical curve composed of an approaching transition curve section, an in-curve constant curvature degree section, and a departing transition curve section, in this sequence, from a curve entrance toward a curve exit, the in-curve constant curvature degree section Cr# has the largest degree of curvature (the largest curvature, the smallest radius of curvature) within the curve. That is, the start point of the in-curve constant curvature degree section Cr# (the point Pxc in FIG. 4) is the first point at which the lateral acceleration acting on the vehicle becomes the maximum when the vehicle passes through the curve at a constant vehicle speed. Accordingly, in the case where the curve deceleration control is executed so as to cause the vehicle to smoothly pass through the curve, preferably, the vehicle speed is adjusted on the basis of at least the start point of the in-curve constant curvature degree section Cr# (the point Pxc in FIG. 4) and the in-curve constant curvature degree Rm# (the radius of curvature Rmc in FIG. 4).

According to the present embodiment, during the curve deceleration control, the vehicle speed can be adjusted so that, near the start point Px# of the in-curve constant curvature degree section Cr#, the vehicle speed decreases to a proper value Vq# determined in consideration of the in-curve constant curvature degree Rm#. Accordingly, the curve deceleration control readily becomes one in which the shape of the constant curvature degree section having the largest degree of curvature is taken into consideration and which matches a driver's intention. As a result, the unnatural sensation which the curve deceleration control imparts to the driver can be mitigated. In addition, since the start point of the in-curve constant curvature degree section Cr#, which is required for the curve deceleration control, is acquired on the basis of the position data and the degree of curvature at each of a plurality of node points rather than on the basis of information regarding the actual operation of the vehicle, the curve deceleration control can be executed properly even for a curve along which the vehicle travels for the first time.

Figure 7:
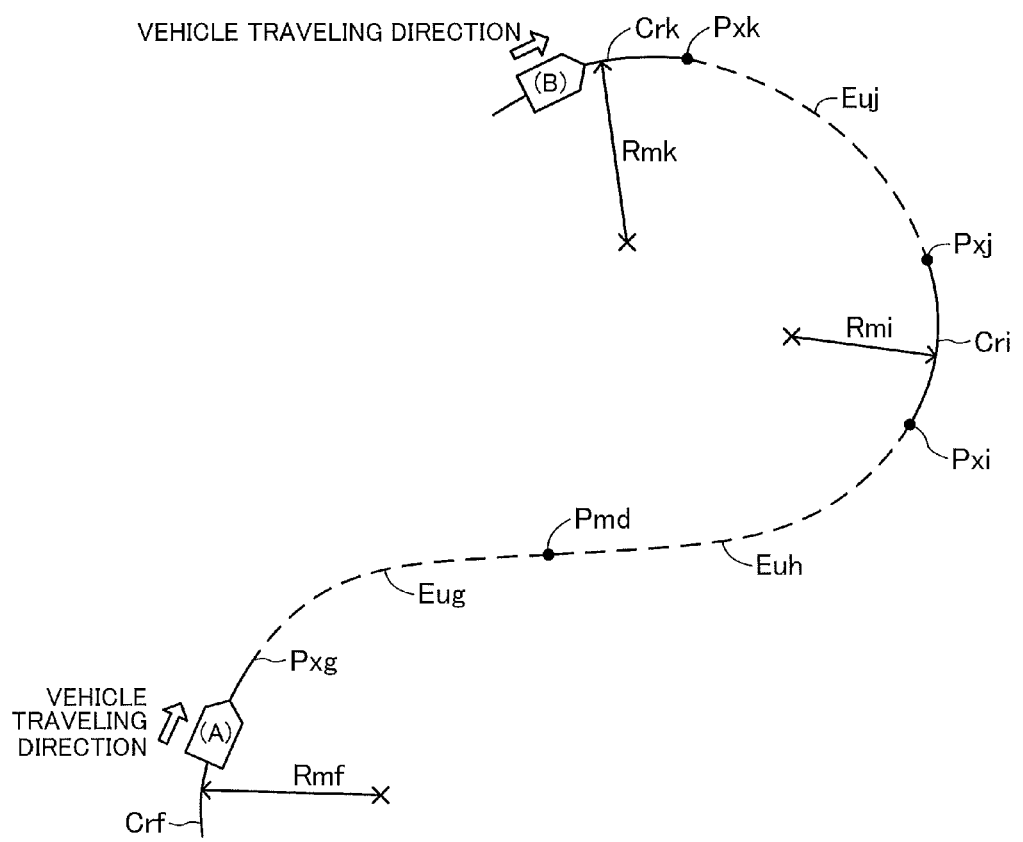
FIG. 7 is an illustration showing an example shape of a road in which two curves are connected together without a straight section therebetween.
Figure 8:
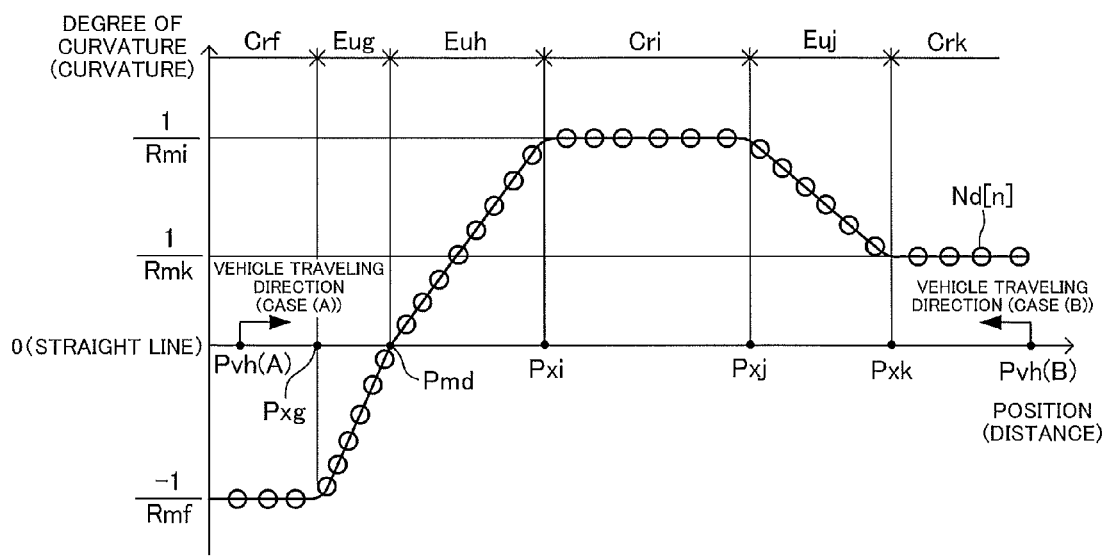
FIG. 8 is a graph showing the relation between position and curvature degree for the road shown in FIG. 7.
Figure 9:
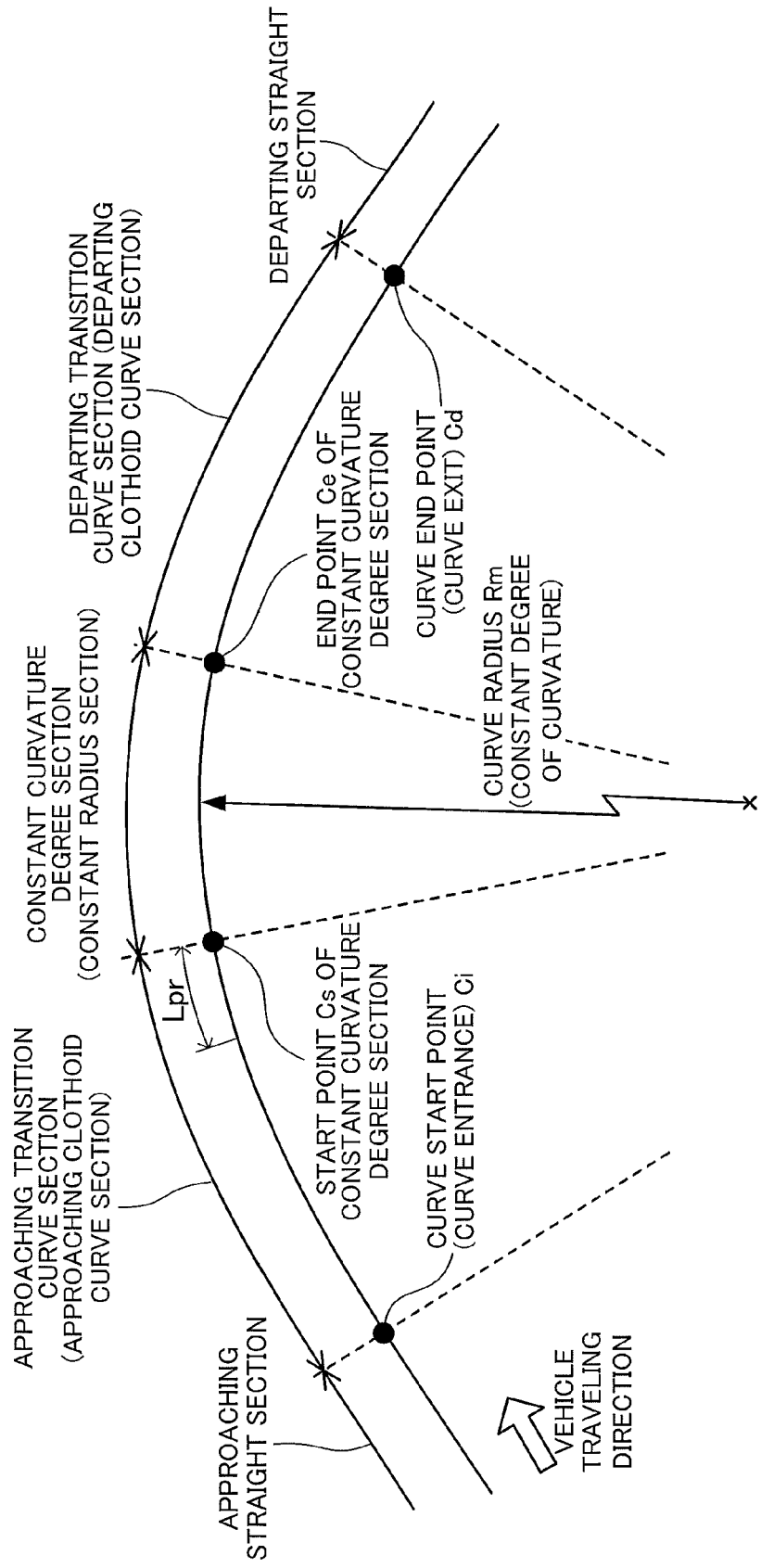
FIG. 9 is an illustration showing a typical configuration of a road including a curve.

In the following, the case where two curves are connected without a straight section therebetween will be additionally described with reference to FIGS. 7 and 8. FIG. 7 shows an example shape of a road which includes a plurality of curves and in which two adjacent curves are connected together without a straight section therebetween. FIG. 8 is a graph showing the relation between the degree of curvature and position of each node point Nd[n] of the road shown in FIG. 7.

In the example shown in FIGS. 7 and 8, there are two possible cases; i.e., a case where the vehicle successively passes through two curves which curve in opposite directions (two successive curves including constant curvature degree sections Crf and Cri, respectively), and a case where the vehicle successively passes through two curves which curve in the same direction (two successive curves including constant curvature degree sections Crk and Cri, respectively). In the following, these cases will be described separately.

<Case where Two Successive Curves Curve in Opposite Directions>

Here, the vehicle is assumed to travel in a direction (A) shown in FIGS. 7 and 8. In this case, there is determined an intermediate portion Pmd at which the degree of curvature Rc[n] becomes equal to that of a straight section (at which the curvature becomes approximately "0," for example, becomes less than the above-mentioned predetermined value kc1). That is, there is computed an intermediate portion Pmd which is located between the curve Crf curving rightward as viewed from the vehicle and the curve Cri curving leftward as viewed from the vehicle and at which the curvature becomes approximately "0." The above-described curve deceleration control is executed, while the intermediate position Pmd is used as the straight-line end position Py#.

<Case where Two Successive Curves Curve in the Same Direction>

Here, the vehicle is assumed to travel in a direction (B) shown in FIGS. 7 and 8. In this case, the end position of one constant curvature degree section which is greater in degree of curvature (which is smaller in radius of curvature or which is larger in curvature) is used as the curve end position Px#, and the end position of the other constant curvature degree section which is smaller in degree of curvature (which is larger in radius of curvature or which is smaller in curvature) is used as the straight-line end position Py#. That is, in the case where the radius of curvature Rmi is smaller than the radius of curvature Rmk, the above-described curve deceleration control is executed, while the point Pxj is used as the curve end position Px# and the point Pxk as the straight-line end position Py#.

What is claimed is:

1. The speed control apparatus for a vehicle comprising:
    vehicle speed acquisition means for acquiring an actual speed of the vehicle;
    vehicle position acquisition means for acquiring a position of the vehicle;
    position data acquisition means for acquiring position data sets representing positions of a plurality of points on a road located ahead of the vehicle traveling on the road;
    curvature degree acquisition means for acquiring a degree of curvature of the road at each of the points;
    constant curvature degree section identification means for identifying, as a part of a curve section of the road, a constant curvature degree section of the road whose degree of curvature is constant on the basis of the plurality of position data sets and the degree of curvature at each point, the constant curvature degree section starting at a starting point that is spaced from a starting point of the curve section of the road, on the basis of a change in the degree of curvature with advancement of the position among the points corresponding to the position data sets;
    constant curvature degree acquisition means for acquiring a constant degree of curvature of the constant curvature degree section on the basis of the degrees of curvatures at the plurality of the points contained in the constant curvature degree section;
    determination means for identifying an in-curve constant curvature degree section and a straight section on the basis of the constant degree of curvature of the constant curvature degree section, the in-curve constant curvature degree section being the constant curvature degree section corresponding to a curve section of the road, and the straight section being the constant curvature degree section corresponding to a straight section of the road;
    end position determination means for determining a position of the starting point of the in-curve constant curvature degree section on the basis of the identified in-curve constant curvature degree section; and
    control means for executing vehicle speed control, which controls the speed of the vehicle, on the basis of the actual speed of the vehicle, the position of the vehicle, the constant degree of curvature of the in-curve constant curvature degree section, and the position of an end point of the in-curve constant curvature degree section;
    wherein the control means computes a first target vehicle speed of the vehicle on the basis of the constant degree of curvature of the in-curve constant curvature degree section and the position of the starting point of the in-curve constant curvature degree section; and
    executes the vehicle speed control on the basis of the result of comparison between the first target vehicle speed and the actual speed of the vehicle; and
    wherein the curvature degree acquisition means determines a first point, a second point, and a third point on the road on the basis of the plurality of position data sets:
    computes a first perpendicular bisector of a line whose opposite ends are located at the first point and the second point, and a second perpendicular bisector of a line whose opposite ends are located at the second point and the third point; and
    computes the degree of curvature at the second point on the basis of an intersection between the first perpendicular bisector and the second perpendicular bisector.

2. The speed control apparatus for a vehicle according to claim 1, wherein the control means computes a second target vehicle speed of the vehicle on the basis of the constant degree of curvature of the in-curve constant curvature degree section, the position of the starting point of the in-curve constant curvature degree section, and the position of the starting point of the curve section; and
    executes the vehicle speed control on the basis of the result of comparison between the second target vehicle speed and the actual speed of the vehicle.

3. The speed control apparatus for a vehicle according to claim 1, wherein the control means computes a second target vehicle speed of the vehicle on the basis of the constant degree of curvature of the in-curve constant curvature degree section, the position of the starting point of the in-curve constant curvature degree section, and the position of the starting point of the curve section;
    selects a smaller one of the first target vehicle speed and the second target vehicle speed as a final target vehicle speed; and
    executes the vehicle speed control on the basis of the result of comparison between the final target vehicle speed and the actual speed of the vehicle.

4. The speed control apparatus for a vehicle according to claim 1, further comprising:

determination means for determining, on the basis of the position of the vehicle and the position of the starting point of the curve section, whether or not the vehicle speed control is to be executed, and setting, on the basis of the result of the determination, an output signal therefrom to a permission state for permitting execution of the vehicle speed control or a prohibition state for prohibiting execution of the vehicle speed control, wherein the control means executes the vehicle speed control when the output signal is in the permission state, and does not execute the vehicle speed control when the output signal is in the prohibition state.

5. The speed control apparatus for a vehicle according to claim 4, wherein the determination means switches the output signal from the prohibition state to the permission state when the position of the vehicle passes through the starting point of the curve section.

6. The speed control apparatus for a vehicle according to claim 4, further comprising:

turning amount acquisition means for acquiring a turning amount representing the degree of turning motion of the vehicle, wherein the determination means starts computation of a cumulative value of the turning amount on the basis of the position of the vehicle and the position of the starting point of the curve section, and switches the output signal from the prohibition state to the permission state when the cumulative value exceeds a predetermined value.

7. A speed control apparatus for a vehicle comprising:

vehicle speed acquisition means for acquiring an actual speed of the vehicle;

vehicle position acquisition means for acquiring a position of the vehicle;

position data acquisition means for acquiring position data sets representing positions of a plurality of points on a road located ahead of the vehicle traveling on the road;

curvature degree acquisition means for acquiring a degree of curvature of the road at each of the points;

constant curvature degree section identification means for identifying, as a part of a curve section of the road, a constant curvature degree section of the road whose degree of curvature is constant on the basis of the plurality of position data sets and the degree of curvature at each point, the constant curvature degree section starting at a starting point that is spaced from a starting point of the curve section of the road, the constant curvature degree section ending at an ending point, on the basis of a change in the degree of curvature with advancement of the position among the points corresponding to the position data sets;

constant curvature degree acquisition means for acquiring a constant degree of curvature of the constant curvature degree section on the basis of the degrees of curvatures at the plurality of the points contained in the constant curvature degree section;

determination means for identifying an in-curve constant curvature degree section and a straight section on the basis of the constant degree of curvature of the constant curvature degree section, the in-curve constant curvature degree section being the constant curvature degree section corresponding to a curve section of the road, and the straight section being the constant curvature degree section corresponding to a straight section of the road;

end position determination means for determining at least one of positions of the starting and the ending points of the in-curve constant curvature degree section on the basis of the identified in-curve constant curvature degree section; and control means for executing vehicle speed control, which controls the speed of the vehicle, on the basis of the actual speed of the vehicle, the position of the vehicle, the constant degree of curvature of the in-curve constant curvature degree section, and the at least one of the positions of the starting and the ending points of the in-curve constant curvature degree section;

wherein the control means computes a first target vehicle speed of the vehicle on the basis of the constant degree of curvature of the in-curve constant curvature degree section and the at least one of the positions of the starting and the ending points of the in-curve constant curvature degree section; and executes the vehicle speed control on the basis of the result of comparison between the first target vehicle speed and the actual speed of the vehicle; and wherein the curvature degree acquisition means determines a first point, a second point, and a third point on the road on the basis of the plurality of position data sets;

computes a first perpendicular bisector of a line whose opposite ends are located at the first point and the second point, and a second perpendicular bisector of a line whose opposite ends are located at the second point and the third point; and computes the degree of curvature at the second point on the basis of an intersection between the first perpendicular bisector and the second perpendicular bisector.

* * * * *